Jan. 27, 1942.  A. C. DRESSLER  2,271,150
FORCED DRAFT BREATHER SYSTEM FOR ENGINES
Filed Jan. 20, 1940
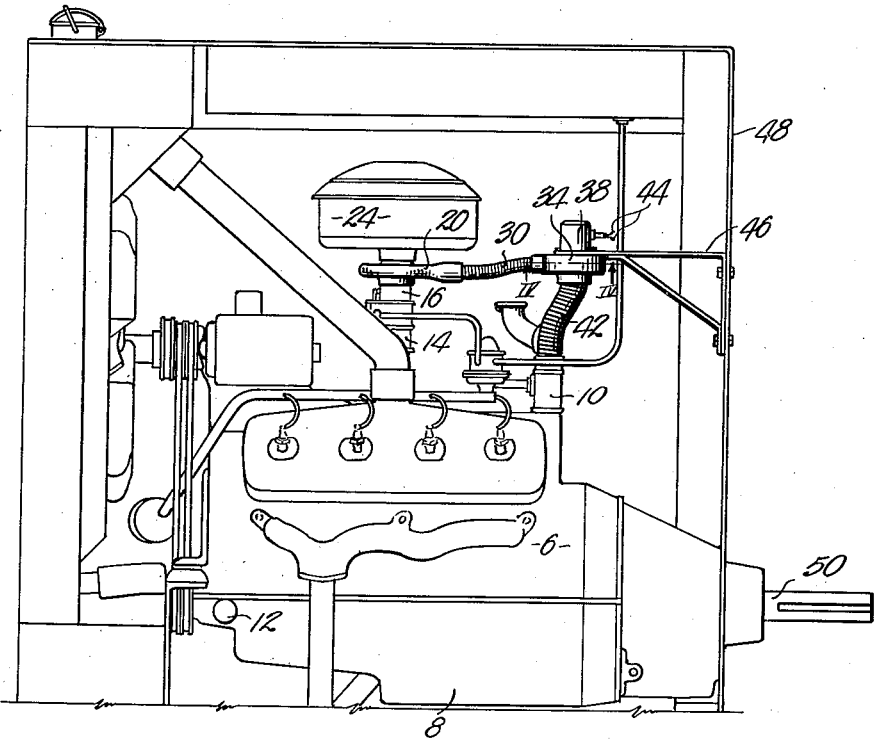
Fig. 1.
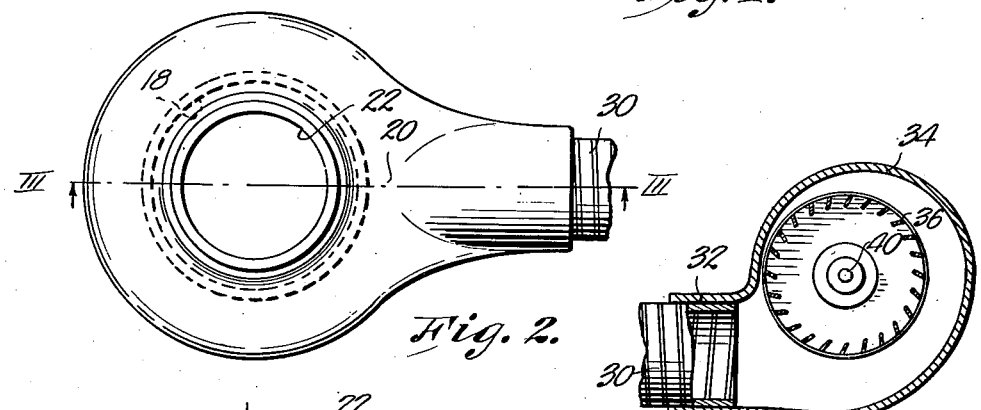
Fig. 2.
Fig. 4.
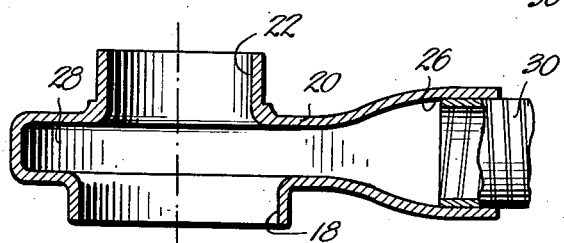
Fig. 3.
INVENTOR.
Adolph C. Dressler
BY
Hoovy Hamilton
ATTORNEYS Patented Jan. 27, 1942

2,271,150

UNITED STATES PATENT OFFICE 2,271,150

FORCED DRAFT BREATHER SYSTEM FOR ENGINES

Adolph C. Dressler, Miami, Okla., assignor to Dieselair Corporation, Miami, Okla., a corporation of Delaware Application January 20, 1940, Serial No. 314,852

3 Claims. (Cl. 123—119)

This invention relates to breather systems for internal combustion engines and has for its primary object, the provision of equipment such as that shown and described in my Patent No. 2,185,501, issued January 2, 1940, with the addition however, of means for establishing a forced draft whereby evolved vapors are withdrawn from the crankcase of the engine and directed to the intake port of the carburetor.

One of the important aims of this invention is the provision of a breather system for engines wherein is incorporated means for establishing a forced draft in a specially disposed conduit for the purpose of evacuating objectionable gases and other light evolved matter from the crankcase, and depositing the same in a hollow head for introduction into the carburetor by forces created through the operation of the engine.

A yet further object of this invention is to provide a breather system for engines wherein two distinct forces are employed for withdrawing evolved vapors and gases from the crankcase and depositing the same in the intake port of the carburetor.

Breather systems designed to remove objectionable gases and vapors from engine crankcases usually utilize draft established through movement of the automobile, or in the case of stationary engines, currents of air created by the movement of air into the intake port of the carburetor.

Under many conditions the evacuating influence of the aforesaid draft and currents of air is not sufficient to establish an efficient system and therefore, the present invention contemplates a controllable force created through the employment of an impeller, the operation of which may be altered as desired without regard to the speed of the engine or the forward movement of the automobile with the engine of which the system is combined.

One embodiment of the invention is illustrated in the accompanying drawing wherein:

Figure 1 is a side elevational view of an internal combustion engine having a breather system combined therewith, which is made in accordance with the present invention.

Fig. 2 is a top plan view of the head of the breather system showing the same entirely removed from the carburetor.

Fig. 3 is a vertical longitudinal central sectional view through the head taken on line III—III of Fig. 2; and Fig. 4 is a fragmentary sectional view through the impeller taken on line IV—IV of Fig. 1.

The invention illustrated, is of the V-8 type and is designated generally by the numeral 6. The crankcase 8 of this invention has a filler neck 10 and the conventional breather opening 12 through which air is forced when the automobile is moving. Ordinarily, the crankcase 8 is evacuated by air moving from breather opening 12 and in through filler neck 10, but the efficiency of such operation is so low that it becomes necessary to provide additional means for withdrawing evolved vapors from within crankcase 8.

Carburetor 14 has an inlet port formed within neck 16 thereof, that is in communication with outlet port 18 of head 20. Inlet port 22 of head 20 communicates with air filter 24 and air passing into carburetor 14 moves downwardly along an axis common to both ports 18 and 22.

Head 20 is hollow and has a vapor intake inlet opening 26 which is in connection with an annular chamber 28 extending around the common axis, on which is located outlet and inlet ports 18 and 22 respectively.

Chamber 28 is relatively narrow so that the two ports 18 and 22 of head 20 are very close together. The movement of air from port 22 to port 18 will create a vacuumatic action or a suction which withdraws vapors from chamber 28 as they are fed thereto through flexible conduit 30, one end of which is in connection with inlet opening 26 while the other end thereof is joined to mouth 32 of housing 34, forming a part of the means for establishing a forced draft within conduit 30.

An impeller 36 within housing 34 is driven by motor 38, the shaft 40 of which is in connection with impeller 36 as seen in Fig. 4.

Another section of flexible conduit 42 joins housing 34 and filler neck 10. This section 42 is somewhat larger in diameter than the section of conduit 30 and the end of conduit 42 which communicates with housing 34 is on the axis of impeller 36. Wires 44 extend from motor 38 to any suitable source of power not here shown and conventional switches may be used to control the flow of current to the motor whereby the latter is operated at desired speeds and times.

When installing the system in automobiles, motor 38, housing 34 and impeller 36 are supported by a bracket 46 mounted directly to some rigid part of the automobile body or frame 48. Conduits 30 and 42 are flexible to allow the necessary relative movement by the engine 6 and frame 48. Current for operating motor 38 may be obtained from the battery usually carried by the automobile.

Manifestly, other means for operating impeller 36 may be used and it is conceivable that impeller 36 may be driven by driven shaft 50 through the employment of any mechanical connections well-known to those skilled in the art.

From the foregoing, it will be clear that the force established by impeller 36 supplements that established in head 20 when engine 6 is in operation. At such time the speed of motor 38 may be retarded, providing always that efficient evacuation is always accomplished by vacuumatic action set up within head 20. When the impeller 36 is used in engine breather systems of the general character herein defined, an even air pressure is established in the conduits without regard to the amount of air entering carburetor 16.

Many additional advantages arise from a system employing means for establishing a forced draft, and while one embodiment has been illustrated and described, it is desired to be limited only by the spirit of the invention and scope of the appended claims.

Having thus described the invention, what is claimed as new and desired to be secured by Letters Patent is:

1. The combination with an internal combustion engine having a crankcase and a carburetor provided with an air intake, of means for moving evolved vapors from within the crankcase to said air intake comprising a housing having an intake port and an outlet port; an impeller in the housing; a motor for driving the impeller; a hollow head provided with an air intake port, an air outlet port in connection with the intake of the carburetor and a vapor inlet opening; a flexible conduit interconnecting the air outlet port of the housing and the vapor inlet port of the head; and a flexible conduit interconnecting the air inlet of the housing and the crankcase of the engine.

2. The combination with an internal combustion engine having a crankcase and a carburetor provided with an air intake, of means for moving evolved vapors from within the crankcase to said air intake comprising a hollow head provided with an air intake port, an air outlet port in connection with the intake of the carburetor, and a vapor inlet opening; a conduit interconnecting the crankcase of the engine and said vapor inlet opening; an impeller in the conduit to direct air through the conduit toward the head; and means for selectively driving the impeller, said head having a chamber therein between the air intake port and the air outlet port thereof in communication with the vapor intake opening.

3. The combination with an internal combustion engine having a crankcase and a carburetor provided with an air intake, of means for moving evolved vapors from within the crankcase to said air intake comprising a hollow head provided with an air intake port, an air outlet port in connection with the intake of the carburetor, and a vapor inlet opening; a conduit interconnecting the crankcase of the engine and said vapor inlet opening; an impeller in the conduit to direct air through the conduit toward the head; and means for driving the impeller, said head having a chamber therein between the air intake port and the air outlet port thereof in communication with the vapor intake opening, said chamber extending around the common axis of said air intake port and the air outlet port of the head whereby air passing from the intake port to the outlet port will draw vapors from the chamber as the impeller forces vapors from the crankcase into the chamber.

ADOLPH C. DRESSLER.